Figure 1:
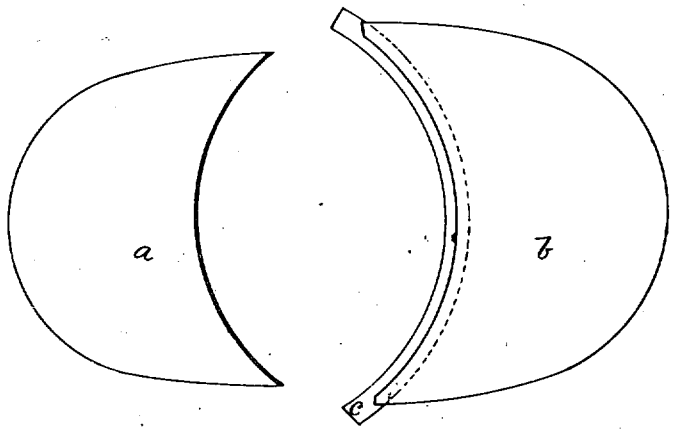

BEST AVAILABLE COPY BEST AVAILABLE COPY

H. D. LOCKWOOD, dec'd.

ANNIE L., R. & A. D. LOCKWOOD, Executors.

ARM-PIT SHIELD.

No. 7,013. Reissued March 28, 1876.

*Witnesses.*

C. H. Crattinger.

W. J. Pratt.

*Inventor*

Annie L. Lockwood. Rhodes Lockwood and Amos D. Lockwood, executors of Estate of Hamilton D. Lockwood, dec'd per Crosby & Gregory Attys.

UNITED STATES PATENT OFFICE.

ANNIE L. LOCKWOOD AND RHODES LOCKWOOD, OF BOSTON, MASS., AND AMOS D. LOCKWOOD, OF PROVIDENCE, R. I., EXECUTORS OF HAMILTON D. LOCKWOOD, DECEASED.

IMPROVEMENT IN ARMPIT-SHIELDS.

Specification forming part of Letters Patent No. 155,529, dated September 29, 1874; reissue No. 7,013, dated March 28, 1876; application filed March 10, 1876.

*To all whom it may concern:*

Be it known that HAMILTON D. LOCKWOOD, of Boston, in the county of Suffolk and State of Massachusetts, did invent an improved Dress-Shield, of which the following, taken in connection with the drawings which accompany and form part of this specification, is a sufficient description.

The invention relates to the manufacture of what are known as "dress-shields," or impervious crescent-shaped lining-pieces, to be stitched or fastened into the armpits, to shield the dress from moisture.

Dress-shields have been made of crescent-shaped pieces of fabrics, having one face of each of the concaved portions for a short distance from its edge, coated with rubber, the rubber faces meeting each other to form the seam or lap as in Patent No. 108,908, and such dress-shields are composed of four pieces of fabric, each two of which are so connected together as to leave a portion of the rubber of one piece exposed at the concaved edge of the half shield, and these rubber-coated faces are applied together and made to adhere.

This improved shield is made of five pieces of fabric, and the seam along the concaved edge is made to occupy the least possible space, and the shield is substantially water-proof.

In this invention each part or half of the shield or protector is composed of the two crescent-shaped pieces or pairs of pieces united by a connecting-piece.

The drawing represents a construction embodying the invention.

Figure 2:
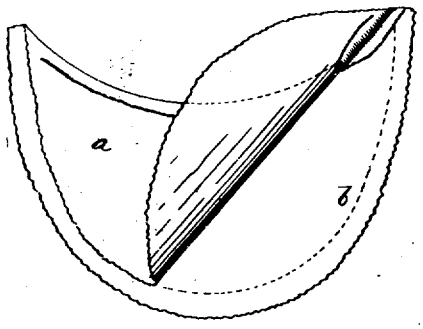

Figure 1 shows the two pieces, which, when joined by the connecting-piece, form the shield or protector. Fig. 2 shows the finished shield.

In this invention each half of the shield is composed of two crescent-shaped pieces, *a a b b*, coated on one side or lined with rubber or rubber compound, and placed with their rubber-coated faces in contact, except at the concaved edges where the pieces are separated for the admission of a welt or connecting-piece, *c*, coated on each side with an india-rubber coating, and after the edges of the welt or connecting-strip are placed between the open ends of the pieces *a a* and *b b*, the ends *a a* and *b b* are pressed together against the welt or connecting-strip, one edge of the strip being connected at one time with one pair of pieces *a* or *b*, and then with the other pair, thereby connecting the two halves *a b* together, making a firm, durable, flexible, and water-proof seam, with a single thickness of cloth forming the connection between the opposite halves *a a b b* of the shield. The two opposite halves are made preferably of different sizes. The welt-piece is cut crosswise or on a bias. After being connected together, as above described, the edges are shown as stitched, and the connection is therefore made much stronger.

We claim as the invention of said HAMILTON D. LOCKWOOD, deceased—

1. A dress-shield composed of the opposite halves *a a b b*, connected by means of an independent connecting-piece, *c*, substantially as described.

2. A dress-shield composed of two pairs of pieces connected by a connecting-piece, *c*, and stitches, substantially as described.

ANNIE L. LOCKWOOD.
RHODES LOCKWOOD.
AMOS D. LOCKWOOD.

Witnesses to signatures of ANNIE L. LOCKWOOD and RHODES LOCKWOOD:
RICHARD E. PICKTHALL,
CHARLES W. SAWYER.

Witnesses to signature of AMOS D. LOCKWOOD:
JAMES S. DAVIS,
JAMES W. BLACKWOOD.